United States Patent
Hübner et al.

(10) Patent No.: US 10,855,206 B2
(45) Date of Patent: Dec. 1, 2020

(54) PIEZOELECTRIC ROTARY DRIVE HAVING A LOADING MEANS DESIGNED AS A LEAF SPRING

(71) Applicant: PHYSIK INSTRUMENTE (PI) GMBH & CO. KG, Karlsruhe (DE)

(72) Inventors: Reinhard Hübner, Waldbronn (DE); Hansjörg Luckert, Karlsruhe (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 568 days.

(21) Appl. No.: 15/572,342

(22) PCT Filed: May 9, 2016

(86) PCT No.: PCT/EP2016/060306
§ 371 (c)(1),
(2) Date: Nov. 7, 2017

(87) PCT Pub. No.: WO2016/180766
PCT Pub. Date: Nov. 17, 2016

(65) Prior Publication Data
US 2018/0131292 A1 May 10, 2018

(30) Foreign Application Priority Data
May 8, 2015 (DE) .......... 10 2015 208 591

(51) Int. Cl.
*H02N 2/12* (2006.01)
*H02N 2/00* (2006.01)
*H02N 2/10* (2006.01)

(52) U.S. Cl.
CPC ............. *H02N 2/006* (2013.01); *H02N 2/101* (2013.01)

(58) Field of Classification Search
CPC ......... H02N 2/123; H02N 2/101; H02N 2/006
See application file for complete search history.

(56) References Cited

U.S. PATENT DOCUMENTS 4,928,030 A * 5/1990 Culp ................... H01L 41/0825
310/328
5,394,049 A * 2/1995 Luecke ................. H02N 2/101
310/328

(Continued)

FOREIGN PATENT DOCUMENTS

| CN | 105556824 A | 5/2016 |
| DE | 10 2011 109590 A1 | 2/2013 |
| WO | WO 2007/022764 A1 | 3/2007 |

OTHER PUBLICATIONS

International Search Report (PCT/ISA/210) dated Aug. 1, 2016, by the European Patent Office as the International Searching Authority for International Application No. PCT/EP2016/060306.

(Continued)

*Primary Examiner* — Thomas M Dougherty
*Assistant Examiner* — Karen B Addison
(74) *Attorney, Agent, or Firm* — Buchanan Ingersoll & Rooney PC (57) ABSTRACT

Disclosed is a piezoelectric rotary drive for a shaft, which includes a piezoelectric actuator, a deformable frame that can be coupled with a coupling section to the shaft in a force-fit manner in order to accomplish a stick-slip drive, and a loading device which can apply a preloading force to the coupling section and/or the actuator and/or the shaft. To facilitate production and assembly, the loading device can be a leaf spring which in the relaxed state extends substantially in a plane, such as along a straight line.

21 Claims, 5 Drawing Sheets

(56) References Cited

U.S. PATENT DOCUMENTS

| | | | | |
|---|---|---|---|---|
| 5,410,206 A | * | 4/1995 | Luecke | H02N 2/101 310/328 |
| 5,712,524 A | * | 1/1998 | Suga | H02N 2/101 310/328 |
| 6,940,210 B2 | * | 9/2005 | Karrai | B82Y 35/00 310/328 |
| 7,196,454 B2 | * | 3/2007 | Baur | H02N 2/025 310/323.01 |
| 8,520,327 B2 | * | 8/2013 | Thomas | G02B 7/08 359/811 |
| 9,106,158 B2 | * | 8/2015 | Hubner | H02N 2/123 |
| 9,312,790 B2 | * | 4/2016 | Culpi | H02N 2/006 |
| 10,250,164 B2 | * | 4/2019 | Hubner | H02N 2/043 |
| 2007/0176514 A1 | * | 8/2007 | Lei | H02N 2/025 310/328 |
| 2010/0290138 A1 | | 11/2010 | Thomas et al. | |
| 2014/0239771 A1 | * | 8/2014 | Hubner | H02N 2/101 310/323.02 |
| 2015/0076965 A1 | * | 3/2015 | Culpi | H02N 2/025 310/323.02 |

OTHER PUBLICATIONS

Written Opinion (PCT/ISA/237) dated Aug. 1, 2016, by the European Patent Office as the International Searching Authority for International Application No. PCT/EP2016/060306.

Office Action dated Feb. 3, 2016, by the German Patent Office for Application No. 102015208591.0.

First Office Action dated Dec. 4, 2018, by the Chinese Patent Office in corresponding Chinese Patent Application No. 201680026587.0, and an English Translation of the Office Action. (11 pages).

Office Action (Notification of the Second Office Action) dated Sep. 10, 2019, by the Chinese Patent Office in corresponding Chinese Patent Application No. 201680026587.0, and an English Translation of the Office Action. (7 pages).

* cited by examiner

PIEZOELECTRIC ROTARY DRIVE HAVING A LOADING MEANS DESIGNED AS A LEAF SPRING

BACKGROUND

The invention relates to a piezoelectric rotary drive for a shaft, comprising at least one piezoelectric actuator, an adjustable and/or deformable frame which has a coupling section that can be coupled to the shaft in a force-fit manner in order to accomplish a stick-slip drive, and at least one loading means which is designed to apply a preloading force to the coupling section and/or the actuator and/or the shaft.

A generic piezoelectric rotary drive is known from DE 10 2011 109 590 A1. There, the coupling section (13) is applied a clamping force by a spring clip (4) in order, firstly, to increase the contact pressure of the coupling section (13) onto the shaft (2) and, secondly, to press two sections (13, 14) of the frame (12) by the spring clip (4) against the piezoelectric actuator (11), so that the sections (13, 14) always follow a piezoelectric deformation of the actuator (11). As can be seen from FIG. 1 of DE 10 2011 109 590 A1, the spring clip (4) is of strip-shaped design and is clamped at the end sides between two retaining sections. The two retaining sections for the spring clip (4) are located on different sides of the frame (12) so that the spring clip (4) extends approximately over half the circumference of the shaft or of frame (12), respectively. The spring clip (4) has a considerable length as well as two bending or kinking points.

The production and assembly of this spring clip (4) are comparatively complex. In addition, settling phenomena occur over time with the known spring clip (4), which can result in less contact pressure of the coupling section against the shaft and/or less pressure of the two sections of the frame against the piezoelectric actuator and thus in less preloading force upon the piezoelectric actuator. Moreover, tolerances in terms of the bending lead to undefined contact pressure or undefined preloading force.

BRIEF SUMMARY

The present invention is therefore based on the object to improve the generic piezoelectric rotary drive by simplifying the production and assembly of the loading means.

For satisfying the object, the invention provides a piezoelectric rotary drive for a shaft, comprising at least one piezoelectric actuator, an adjustable and/or deformable frame which has a coupling section that can be coupled to the shaft in a force-fit manner in order to accomplish a stick-slip drive, and at least one loading means which is designed to apply a preloading force to the coupling section and/or the actuator and/or the shaft, where the loading means is designed as a leaf spring which in the relaxed state extends substantially in a plane, preferably along a straight line. Such loading means can be produced with little effort and thus in an inexpensive manner. "Substantially in a plane" presently refers to the customary manufacturing accuracy or customary manufacturing tolerance for the sheet metal plates used in one embodiment.

A leaf spring is used, for example, in automotive production of off-road vehicles, trucks or vans in order to accomplish simple and inexpensive wheel suspension. The leaf spring is preferably clamped in at both ends (double-sided leaf spring) and is loaded at the center with a load oriented transverse or perpendicular to the plane of extension of the leaf spring. Alternatively, a leaf spring can also be clamped in only at one side at the end (one-sided leaf spring), where the deflecting force acts transverse or perpendicular to the plane of extension of the leaf spring onto the other end of the leaf spring. The leaf spring is made, for example, of a flat, approximately rectangular profile, for example, from spring steel. Accordingly, a leaf spring does not require any complex shaping and can be mounted with little effort. In contrast to the solution known from prior art, it is in particular not necessary to guide the loading means around half the circumference of the shaft and the frame. Accordingly, a flat spring can be used instead of a preformed or deformed and encompassing spring. The advantages of such a flat spring are, firstly, the omission of a respective shaping step and, secondly, the possibility of using brittle materials with a considerably higher tensile yield point, so that significantly higher preloading forces can be applied. The leaf spring is preferably designed as a flat leaf spring.

The invention represents a further development of the invention described in DE 10 2011 109 590 A1 and is based substantially on the mechanical principle described therein. The contents of DE 10 2011 109 590 A1 are by reference expressly incorporated herein and constitute a part of this disclosure, provided that they are not clearly in contradiction thereto. This applies, in particular, to sections [0001] to [0030] of the published patent application DE 10 2011 109 590 A1 in which the principle of the invention as well as the first embodiment are described.

Advantageous developments of the invention are objects of the dependent claims.

It can be advantageous to have the loading means be designed as a double-sided leaf spring and be clamped between two retaining sections. In comparison to the one-sided leaf spring, higher preloading forces can then be generated. In addition, a simplified miniaturization of the piezoelectric rotary drive is then obtained. In particular, a symmetrical design of the double-sided leaf spring results in extremely simple assembly thereof.

It can also be useful to have the loading means generate a constant bending stress over the length of the spring, where the loading means preferably tapers toward at least one end, particularly preferably towards both ends. Preferably, starting out from a load region, preferably a center region, which in a preferred embodiment has a constant width, the loading means tapers at least up to one or more retaining sections in which the loading means is clamped in. The taper, therefore, does not need to reach to the end of the loading means. Rectangular leaf springs of a constant thickness do not optimally utilize the existing material. A shape is therefore more suitable in which the bending stresses remain constant over the length of the spring. This can achieve a uniform material stress over the length of the spring. Preferably, the loading means tapers via trapezoidal transitional sections by decreasing the width, where the thickness of the material remains the same. Alternatively, the loading means comprises tapered or pyramidal transitional sections and tapers by simultaneously reducing the thickness and the width. Leaf springs of this shape are known as parabolic springs, trapezoidal springs or hyperbolic springs.

It can prove to be practical to have the piezoelectric actuator drive the coupling section in a stick phase or in a slip phase of the stick-slip drive against the preloading force of the loading means. As a result, the loading means is increasingly tensioned or loaded, whereby the restoring force of the loading means increases. As a result, a tension potential can be built up, which can be advantageously used, for example, in another drive phase of the stick-slip drive.

It can also be useful to have the loading means displace the coupling section in a slip phase or in a stick phase of the stick-slip drive due to the preloading force of the loading means. A previously acquired tension potential of the loading means can then be released.

It can be advantageous to have the coupling section rotate together with the shaft about the shaft axis in the stick phase of the stick-slip drive. Compared to a solution known from U.S. Pat. No. 5,410,206, in which the shaft is driven by a tangential motion of the coupling section, the shaft is guided better by the coupling section rotating with the shaft, whereby also larger mechanical forces can be transferred.

It can also prove to be advantageous to have the coupling section have a bearing which is supported at least temporarily on the loading means, preferably centrally between two retaining sections of the loading means, where the bearing in the stick phase or in the slip phase of the stick-slip drive is pressed preferably against the loading means against the preloading force of the loading means and/or in the slip phase or in the stick phase of the stick-slip drive is displaced by the loading means due to the preloading force of the loading means. Preferably, the loading means is subjected to bending stress when the tension potential is developed. The bearing then preferably presses centrally on the leaf spring, preferably between two retaining sections, for example, perpendicular to the plane of extension, so that the leaf spring is substantially taken to a curved state. This embodiment has the advantage that the coupling section interacts directly with the loading means. When the leaf spring advantageously has a constant width in the region of contact with the bearing of the coupling section, while the adjoining leaf spring sections taper in terms of the width, a local exaggeration of the bending stress or the deformation occurs in the curved state of the leaf spring in the region of contact of the leaf spring with the bearing which leads to a slight V-shape in the leaf spring and a stable equilibrium position on the bearing so that displacement of the leaf spring relative to the bearing is prevented.

It can also prove to be practical to have the loading means be made of brittle material. Brittle materials break close to the elasticity limit without or with only slight plastic deformation (brittle fracture). Such materials usually have great hardness. Therefore, comparatively large forces can then be applied. This embodiment opens up the use of completely new materials for the loading means, in particular, metallic or ceramic materials. The piezoelectric rotary drive according to the invention is therefore no longer limited by the material of the loading means in terms of its possible applications. Instead, other fields of application arise, such as a high-purity vacuum, strong surrounding magnetic fields or a cryogenic environment.

It can be useful to have the loading means be free of plastic deformation at least in a loaded region, preferably over the entire length of the loading means. The loaded region preferably extends between two retaining sections, between which the loading means is clamped in, or between the points of the load input and load output. Plastic deformation entails potential weak points and therefore limits the range of application of the loading means, in particular, the tensioning forces respectively producible and transferable.

Furthermore, it can be advantageous to have the loading means and/or the piezoelectric actuator and/or the shaft be arranged on the same longitudinal side of the frame. This allows for a simple structure of the frame while simultaneously having a reliable transfer of high clamping forces. In particular, preloading the piezoelectric actuator relative to the frame can also be ensured with little effort with such an arrangement.

According to a further advantageous embodiment, the coupling section surrounds the shaft at least in sections, preferably over more than half the circumference, where the coupling section preferably comprises two legs defining a coupling opening, where one of the legs forms a retaining section for clamping the loading means in and the other leg forms a bearing. Such an arrangement enables the shaft and the actuator to be mounted on the frame in a manner which is easy to handle. Preferably, the leg forming the bearing or the leg forming the retaining portion has two engaging sections separated from one another by a non-engaging section, and the respective other leg has an engaging section, where the engaging sections are engaged with the shaft, and the non-engaging section accordingly does not contact the shaft. Overall, therefore, three mutually separate engaging sections arise which are in contact with the shaft. This ensures that the coupling section transmits a substantially rotary motion to the shaft and, for example, is not excited to a wobble motion.

Particularly preferably, the frame comprises three legs which form two receptacles in the intermediate spaces, where the shaft is arranged in the one receptacle between a first outer leg and a center leg, and the piezoelectric actuator is arranged in the other receptacle between a second outer leg and the center leg, where the loading means is clamped in between the two outer legs of the frame, where the center leg of the frame preferably forms a bearing, where the second outer leg is connected in an articulated manner to the center leg, preferably by way of a flexure hinge. The transmission of force between the loading means and the coupling section of the frame can thus be effected in a particularly advantageous manner. In this embodiment, both the shaft and the piezoelectric actuator are disposed between the two outer legs of the frame between which the loading means is tensed up. As a result, the actuator, the shaft and the coupling section can at the same time be subjected to a preloading force by way of the same loading means, which increases the contact pressure and thus the transferable forces between the movable parts of the piezoelectric rotary drive.

Further preferred embodiments of the invention arise from a combination of the features described in the claims, the figures and the description.

DETAILED DESCRIPTION OF THE PREFERRED EMBODIMENTS

The preferred embodiment of the invention shall be described below with reference to the accompanying figures.

The frame 4 of the piezoelectric rotary drive 1 is substantially W-shaped and comprises three legs 4a, 4b, 4c which in the intermediate spaces form two receptacles that open towards the same side of the frame 4. The shaft 2 is arranged in one of these receptacles between a first outer leg 4a and the center leg 4b, where the shaft axis is oriented substantially perpendicularly to the plane of extension of the frame 4. These two legs 4a, 4b of the frame 4 form a substantially U-shaped coupling section 5 which extends over more than half the circumference of the shaft 2 and defines a coupling opening.

The piezoelectric actuator 3 is arranged in the other receptacle between the center leg 4b and the second outer leg 4c of the frame 4. The second outer leg 4c is hingedly connected to the center leg 4b of the frame 4 by way of a flexure hinge 4d.

By applying a control voltage to electrodes mounted on the actuator element, the piezoelectric actuator 3 is deformed in one working direction which extends tangentially or substantially tangentially to the circumference of the shaft 2. As a result, the center leg 4b of the frame 4, which forms part of the coupling section 5, is moved in the circumferential direction of the shaft 2 by actuating the piezoelectric actuator 3. The linear motion of the piezoelectric actuator 3 is converted into a rotary or pivotal motion of the coupling section 5 about the shaft axis due to the mechanical conditions, in particular for the reason that the center leg 4b is substantially rigidly connected to the first leg 4a of the frame 4 in order to form the coupling section 5 but is coupled in an articulated manner to the second outer leg 4c of the frame 4 by way of the flexure hinge 4d on which the piezoelectric actuator 3 is supported.

In the present embodiment, the loading means 6 is designed as a double-sided flat leaf spring and is clamped in between two retaining sections 7, 8 at the outer two legs 4a, 4c of the frame 4. The loading means 6 there has a constant thickness and in the unloaded and relaxed state extends substantially in a plane along a straight line between the two retaining sections 7, 8. Starting out from an approximately rectangular center region 6a in which the loading means 6 has the greatest width, the loading means 6 tapers towards both ends in approximately trapezoidal transitional sections 6b up to hook-shaped end sections 6c, which are in a form-fit manner engaged with the hook-shaped retaining sections 7, 8. This shape of the double-sided leaf spring produces a constant or at least approximately constant bending stress over the length of the spring and is referred to, for example, as a trapezoidal spring. The retaining sections 7, 8 are each formed on the free ends of the outer two legs 4a, 4c of the frame 4. At least the loaded region of the loading means 6 between the two retaining sections 7, 8 is free of plastic deformation so that no mechanical weak points exist in this continuous region between the two retaining sections 7, 8.

The center leg 4b of the frame 4, which represents part of the coupling section 5, forms a bearing 9 at its free end which is supported at the loading means 6 at the center between the two retaining sections 7, 8. In the stick phase or in the slip phase of the stick-slip drive, depending on the direction of operation of the piezoelectric rotary drive, the bearing 9 is pressed against the loading means 6 against the pre-loading force of the loading means. The loading means 6 is thereby charged, whereby the tension potential of the loading means 6 is increased. In the respectively subsequent slip phase or in the stick phase of the stick-slip drive, the bearing 9 is displaced by the loading means 6 due to the preloading force of the loading means 6. The forces arising from the engagement between the loading means 6 and the bearing 9 support the rotary or pivotal motion of the coupling section used for rotationally driving the shaft.

Figure 1:
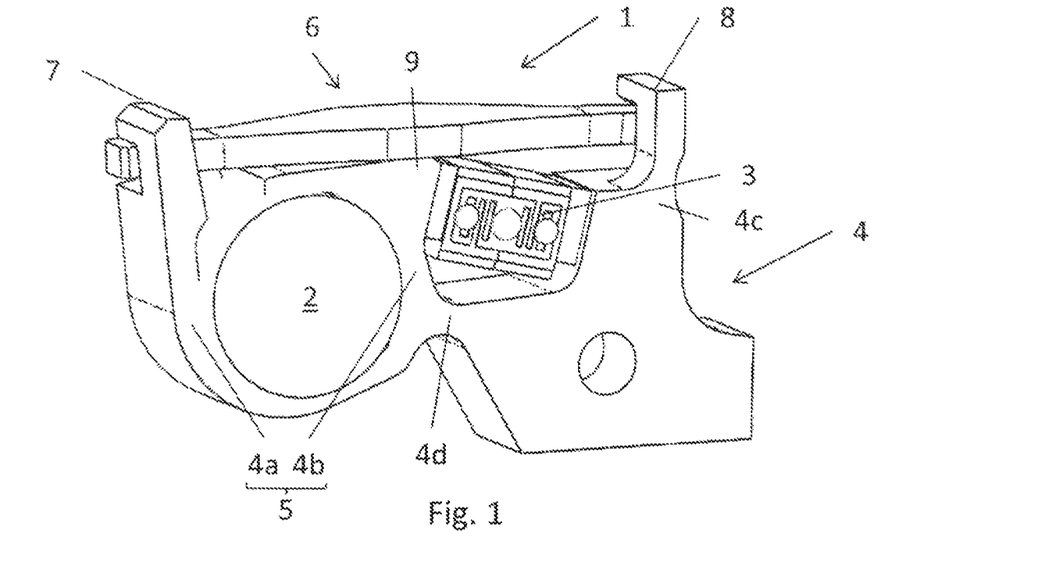
FIG. 1 shows a perspective view of the piezoelectric rotary drive according to one embodiment of the invention.
Figure 2:
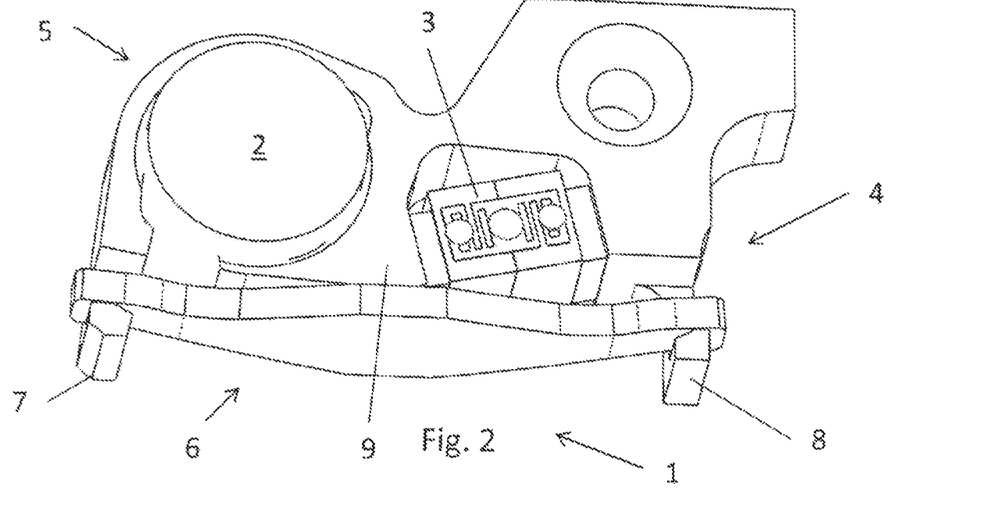
FIG. 2 shows a further perspective view of the piezoelectric rotary drive from FIG. 1.
Figure 3:
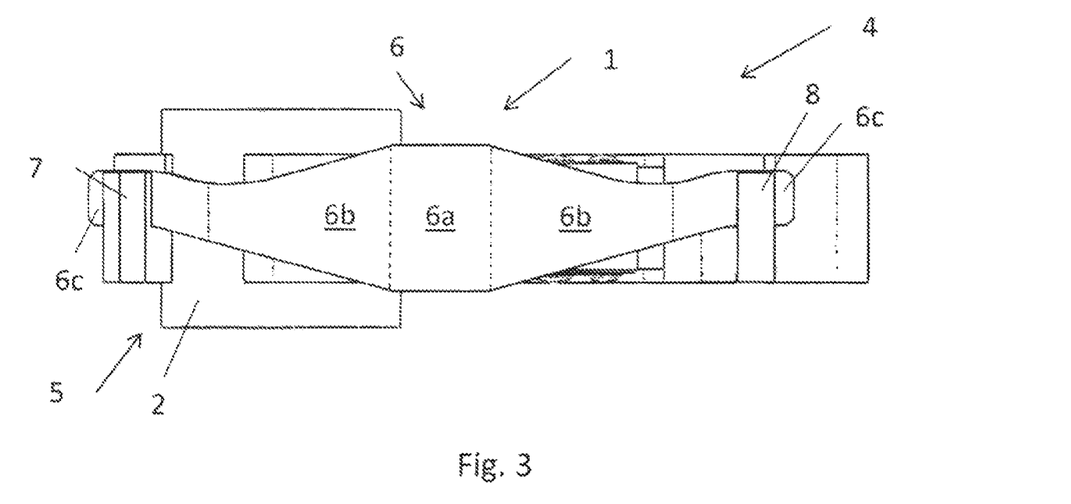
FIG. 3 shows a top view of the piezoelectric rotary drive from FIG. 1 substantially perpendicular to the axial direction of the shaft and perpendicular to the plane of extension of the loading means with a view onto the loading means.
Figure 4:
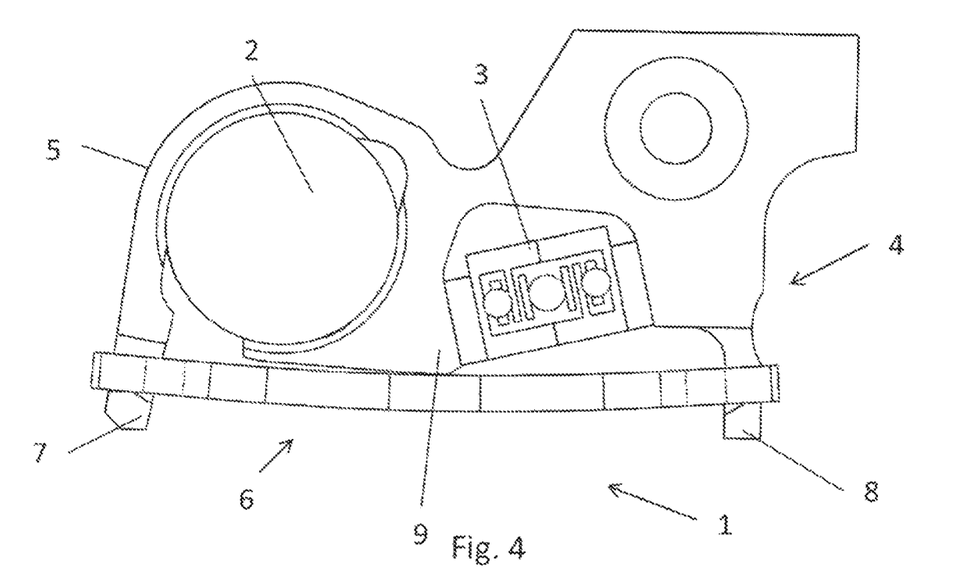
FIG. 4 shows a side view of the piezoelectric rotary drive from FIG. 1 in the axial direction of the shaft with a view onto the piezoelectric actuator.
Figure 5:
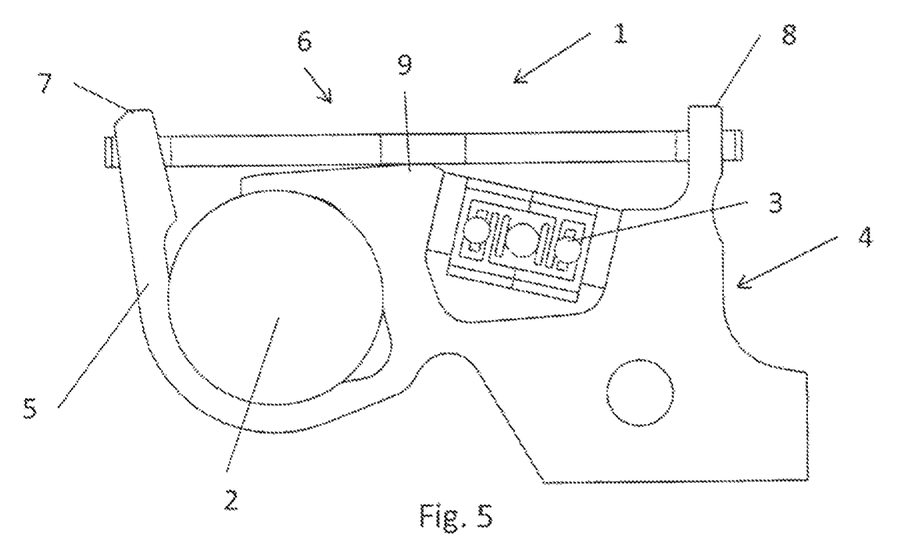
FIG. 5 shows a further side view of the piezoelectric rotary drive from FIG. 1 in the axial direction of the shaft with a view onto the piezoelectric actuator in a first state of the loading means.
Figure 6:
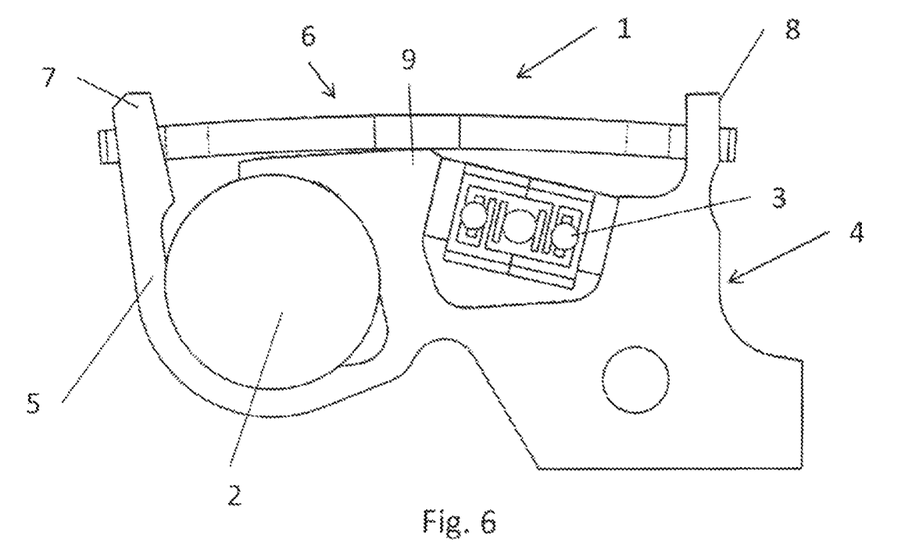
FIG. 6 shows a further side view of the piezoelectric rotary drive from FIG. 1 in the axial direction of the shaft with a view onto the piezoelectric actuator in a second state of the loading means, in which the frame and the loading means are elastically deformed as compared to the first state according to FIG. 5.

For reasons of representation, the loading means 6 in FIG. 5 has a planar shape, although in reality it is always slightly curved in the mounted state. Due to the geometric relationships between the bearing 9 and the two retaining sections 7, 8, said curved shape arises in the mounted state of the loading means 6, where the deformation of the loading means 6 is purely elastic. As a result of the elastic deformation of the loading means 6, a force is produced which leads to the bearing 9 displacing the center region 6a substantially perpendicular to the plane of extension of the loading means 6. Furthermore, a statically determined holder is obtained by mounting or holding the loading means 6 at the two retaining sections 7, 8 and with the respective support at the bearing 9.

As a result, the present invention enables using a loading means 6 that is particularly easy to produce and mount. In particular, a flat spring is used which is designed as a leaf spring and is loaded to bend at the center instead of a preformed or deformed spring which extends around half the circumference of the shaft and the frame and is loaded to tension like in the first embodiment of DE 10 2011 109 590 A1. The advantages of such a spring are the omission of a respective forming step and the use of brittle or plastically non-deformable materials with a considerably higher tensile yield point, so that significantly higher preloading forces can be applied. In addition, the length of the loading means can be significantly reduced so that a significant amount of material can be saved. Finally, the present invention offers the possibility to try out in a simple and inexpensive manner a plurality of different and easily produced loading means with the existing geometry of the frame 4, in order to thereby achieve optimized adaptation of the spring or preloading forces.

A further preferred embodiment of the invention shall be described below with reference to the above-mentioned embodiment and to the accompanying figures. This further preferred embodiment corresponds in its structure to the embodiment described above, and only further details or changes shall be explained below. The retaining sections 7, 8 are each formed on the free ends of the outer two legs 4a, 4c of the frame 4. The retaining section 7 is there substantially formed as a groove in the leg 4a, whereas the outer leg 4c substantially comprises a projection as part of the retaining section 8. This geometry of the retaining sections 7, 8 allows for a comparatively simple production of the frame 4 and also simple mounting of the loading means 6 from the side. In particular, the outer leg 4c has to meet very special requirements. Its geometrical configuration must ensure, firstly, that the preloading force of the loading means 6 arising from the installation situation which is typically between 30 and 40 N, is safely absorbed without any significant deformation arising at the outer leg 4c. At the same time, the outer leg 4c must have elastic properties which make it possible to compensate the deformation of the frame in this region resulting from the deformation of the actuator, so that a disadvantageous relative motion between the loading means 6 and the holding portion 8 does not arise or only in an insignificant manner. With a change in the length of the actuator by 4 μm of the previously described desired elastic deformation, the outer leg 4c may typically produce a maximum resistance force of 1 N. In order to achieve the above-mentioned requirements, the outer leg 4c is designed such that it has a relatively large material cross-section in the region of the projection or adjoining the latter, in order to subsequently reduce or taper toward the part of the frame 4 adjoining the leg 4c.

This further preferred embodiment enables the same fields of application as the previously described embodiment and has similar advantages.

Figure 7:
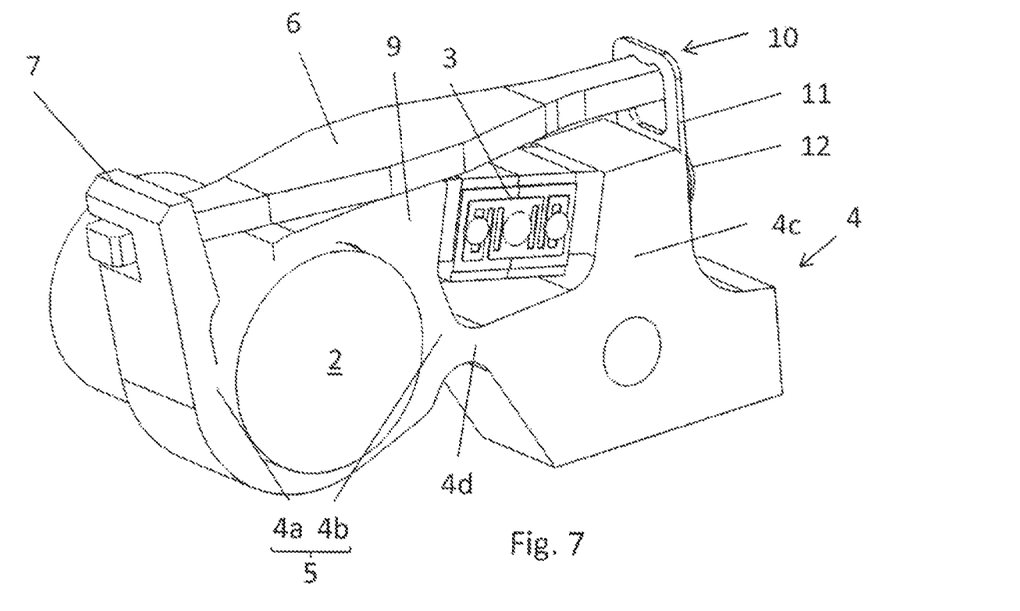
FIG. 7 shows a perspective view of a variant of the embodiment of the piezoelectric rotary drive.
Figure 8:
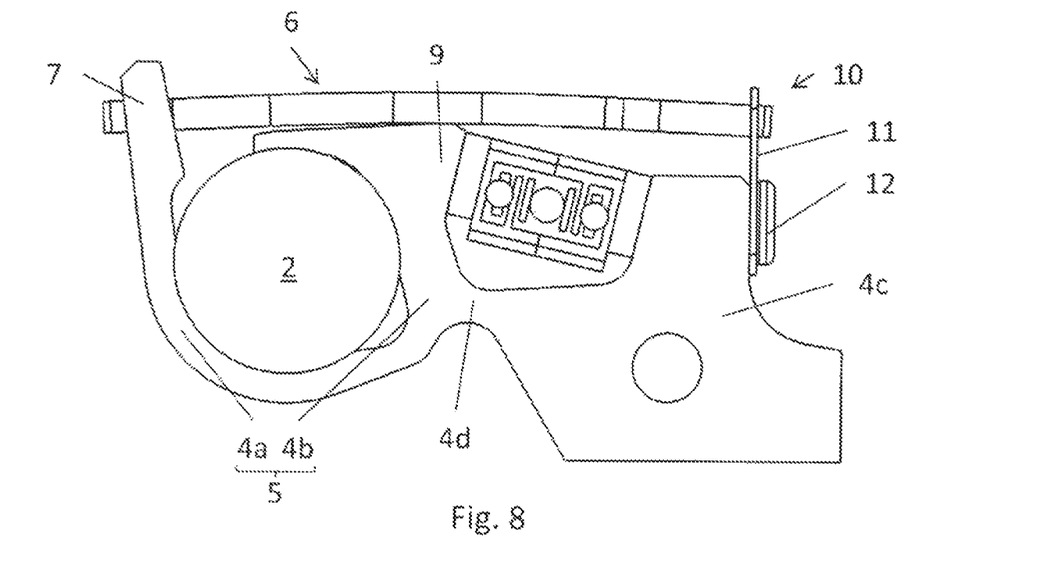
FIG. 8 shows a side view of the piezoelectric rotary drive from FIG. 7 in the axial direction of the shaft with a view onto the piezoelectric actuator.
Figure 9:
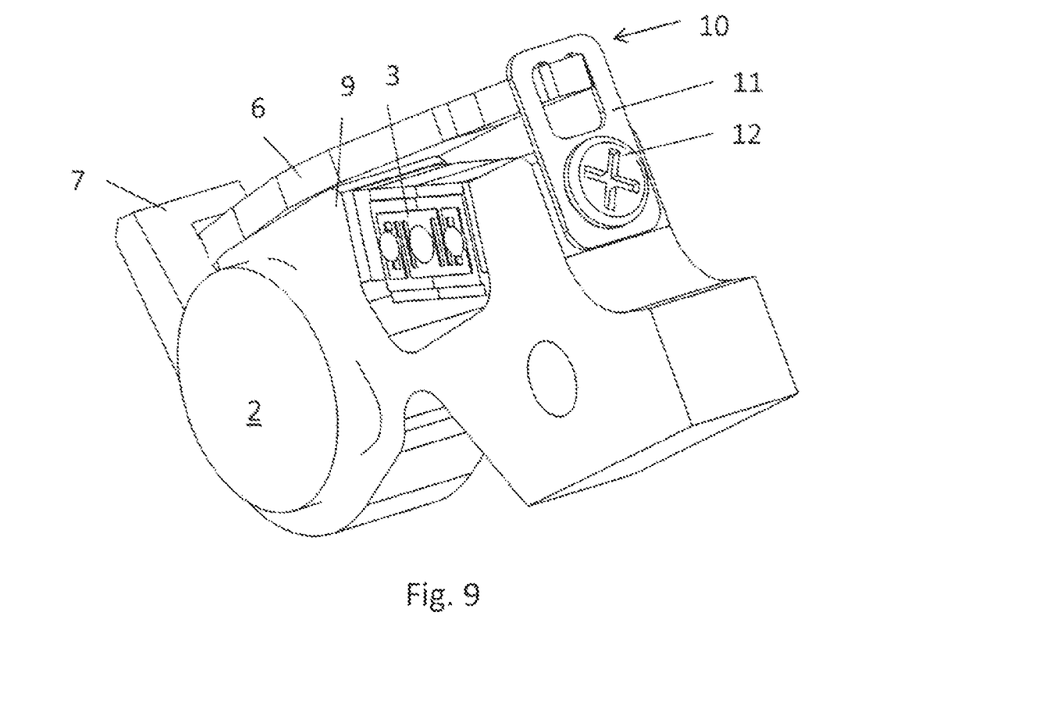
FIG. 9 shows a perspective view of the variant of the embodiment of the piezoelectric rotary drive from FIG. 7 with a view onto the retaining section according to this variant.

One variant of the preferred embodiment of the invention shall be described below with reference to the further FIGS. 7 and 9. This variant of the preferred embodiment corresponds in its structure to the embodiments described above, and only further details or changes shall be explained below.

In this variant, the loading means 6 is also designed as a double-sided flat leaf spring and is clamped in between the retaining section 7, which is formed on the outer legs 4a of the frame 4, and the retaining section 10, which is formed on the outer legs 4c of the frame 4. The retaining section 7 on the outer legs 4a of the frame 4 corresponds to the retaining section of the aforementioned embodiments. The retaining section 10 on the outer leg 4c of the frame 4 is substantially formed by a sheet metal plate 11, which is screwed onto the leg 4c with a screw 12. Formed into the sheet metal plate 11 is an opening into which the end section 6c of the loading means 6 extends and is secured by a projection of the sheet metal plate, as shown in the figures. The preload of the loading means is adjustable by the configuration of the opening or the size of the projection, respectively. Alternatively, respective adjustment of the preload can be effected by displacing the sheet metal plate 11, for example, by way of a long hole.

The loading means is guided or supported on both sides in the opening of the sheet metal plate 11 so that any slippage or displacement of the loading means in a direction substantially perpendicular to the direction of extension of the loading means is effectively prevented. In addition, a sheet metal plate easily provides the further required bearing properties, namely great stiffness in the longitudinal direction of the sheet metal plate for absorbing the preloading force of the loading means, and at the same time low flexural rigidity so that the sheet metal plate is accordingly easily deformable in order to prevent a relative motion between the loading means and the sheet metal plate, where the projection of the sheet metal plate also advantageously contributes to this.

In the embodiment illustrated, the retaining section 10 on the outer leg 4c of the frame 4 is substantially formed by a sheet metal plate 11, which is screwed with a screw 12 onto the leg 4c that is near the actuator. Alternatively, the retaining section on the further outer leg 4a of the frame 4 is substantially formed by a sheet metal plate 11, which is screwed with a screw 12 onto the leg 4c that is remote from the actuator. In a further alternative, the retaining sections, both outer legs of the frame are each substantially formed from sheet metal, and are each screwed to the respective leg with a screw.

This further preferred embodiment and the alternatives explained enable the same fields of application as the previously described embodiment and have similar advantages.

LIST OF REFERENCE NUMERALS 1 piezoelectric rotary drive
2 shaft
3 piezoelectric actuator
4 frame
4a-c leg of the frame
4d flexure hinge
5 coupling section
6 loading means
6a center region
6b transitional section
6c end section
7, 8, 10 retaining sections
9 bearing

The invention claimed is:

1. A piezoelectric rotary drive for a shaft, comprising:
at least one piezoelectric actuator;
an adjustable and/or deformable frame which has a coupling section configured to be coupled to a shaft in a force-fit manner to accomplish a stick-slip drive; and
at least one loading means configured to apply a preloading force to said coupling section and/or said actuator and/or said shaft, wherein said loading means is a leaf spring which in a relaxed state extends substantially in a plane.

2. A piezoelectric rotary drive according to claim 1, wherein said loading means is a double-sided leaf spring which is clamped in between two retaining sections.

3. A piezoelectric rotary drive according to claim 2, wherein at least one of said retaining sections is formed from an element which locks said loading means.

4. A piezoelectric rotary drive according to claim 2, wherein at least one of said retaining sections is formed from a element which is locked at one of said legs.

5. A piezoelectric rotary drive according to claim 1, wherein said loading means is configured to generate a constant bending stress over a length of the spring, where said loading means tapers toward at least one end.

6. A piezoelectric rotary drive according to claim 5, wherein said loading means, starting from a center section, tapers towards both ends while having a constant width and/or thickness.

7. A piezoelectric rotary drive according to claim 6, wherein said piezoelectric actuator is configured to drive said coupling section in a stick phase or in a slip phase of said stick-slip drive against the preloading force of said loading means.

8. A piezoelectric rotary drive according to claim 6, wherein said loading means in a slip phase or in a stick phase of said stick-slip drive is configured to displace said coupling section due to the preloading force of said loading means.

9. A piezoelectric rotary drive according to claim 6, comprising:
the shaft, wherein said coupling section is configured to rotate together with said shaft about the shaft axis in a stick phase of said stick-slip drive.

10. A piezoelectric rotary drive according to claim 6, wherein said coupling section comprises:
a bearing which is supported at least temporarily on said loading means, where said bearing in a stick phase or in a slip phase of the stick-slip drive is pressed against said loading means against the preloading force of said loading means and/or said bearing in the slip phase or in the stick phase of said stick-slip drive is configured to be displaced by said loading means due to the preloading force of said loading means.

11. A piezoelectric rotary drive according to claim 6, wherein said loading means is free of plastic deformation at least in a loaded region.

12. A piezoelectric rotary drive according to claim 6, wherein said coupling section surrounds said shaft at least in sections, where said coupling section comprises two legs defining a coupling opening, where one of said legs forms a retaining section for clamping in said loading means and said other leg forms a bearing.

13. A piezoelectric rotary drive according to claim 5, wherein said piezoelectric actuator is configured to drive said coupling section in a stick phase or in a slip phase of said stick-slip drive against the preloading force of said loading means.

14. A piezoelectric rotary drive according to claim 5, wherein said loading means in a slip phase or in a stick phase of said stick-slip drive is configured to displace said coupling section due to the preloading force of said loading means.

15. A piezoelectric rotary drive according to claim 5, comprising:
the shaft, wherein said coupling section is configured to rotate together with said shaft about the shaft axis in a stick phase of said stick-slip drive.

16. A piezoelectric rotary drive according to claim 5, wherein said coupling section comprises:
a bearing which is supported at least temporarily on said loading means, where said bearing in a stick phase or in a slip phase of the stick-slip drive is pressed against said loading means against the preloading force of said loading means and/or said bearing in the slip phase or in the stick phase of said stick-slip drive is configured to be displaced by said loading means due to the preloading force of said loading means.

17. A piezoelectric rotary drive according to claim 1, comprising:
the shaft, wherein said coupling section is configured to rotate together with said shaft about the shaft axis in a stick phase of said stick-slip drive.

18. A piezoelectric rotary drive according to claim 1, wherein said coupling section comprises:
a bearing which is supported at least temporarily on said loading means, where said bearing in a stick phase or in a slip phase of the stick-slip drive is pressed against said loading means against the preloading force of said loading means and/or said bearing in the slip phase or in the stick phase of said stick-slip drive is configured to be displaced by said loading means due to the preloading force of said loading means.

19. A piezoelectric rotary drive according to claim 1, wherein said loading means is made from brittle material.

20. A piezoelectric rotary drive according to claim 1, wherein said loading means is attached to at least one retaining section in a force-fit and/or substance-fit and/or a form-fit manner, where at least one of said retaining sections, is formed on said frame.

21. A piezoelectric rotary drive according to claim 1, comprising:
the shaft, wherein said frame comprises:
three legs which form two receptacles in the intermediate spaces, where said shaft is arranged in said one receptacle between a first outer leg and a center leg, and said piezoelectric actuator is arranged in said other receptacle between a second outer leg and said center leg, where said loading means is clamped in between said two outer legs of said frame, where said center leg of said frame forms a bearing, where said second outer leg is connected in a hinged manner to said center leg.

* * * * *